US012682105B2

(12) United States Patent
Callewaert et al.

(10) Patent No.: US 12,682,105 B2
(45) Date of Patent: Jul. 14, 2026

(54) CYBER PROTECTION AUTOMATION WITH INTERMITTENT CONSISTENCY

(71) Applicant: Dell Products, L.P., Hopkinton, MA (US)

(72) Inventors: Peter Callewaert, Eernegem (BE); Dennis J. Trulli, Jr., Hudson, MA (US)

(73) Assignee: Dell Products, L.P., Hopkinton, MA (US)

( * ) Notice: Subject to any disclaimer, the term of this patent is extended or adjusted under 35 U.S.C. 154(b) by 204 days.

(21) Appl. No.: 18/655,449

(22) Filed: May 6, 2024

(65) Prior Publication Data

US 2025/0342269 A1     Nov. 6, 2025

(51) Int. Cl.
        *G06F 21/62*          (2013.01)
        *G06F 11/1446*       (2026.01)
(52) U.S. Cl.
        CPC ...... *G06F 21/6227* (2013.01); *G06F 11/1456* (2013.01); *G06F 2201/84* (2013.01)
(58) Field of Classification Search
        CPC ............. G06F 21/6227; G06F 11/1456; G06F 11/1451; G06F 11/1464; G06F 11/1471; G06F 11/2058; G06F 11/2064; G06F 11/2071; G06F 11/2074; G06F 11/2094; G06F 11/2097; G06F 2201/84; G06F 2201/82
        See application file for complete search history.

(56) References Cited

U.S. PATENT DOCUMENTS

| | | | | |
|---|---|---|---|---|
| 11,579,778 | B2 * | 2/2023 | Edara ...................... | G06F 3/064 |
| 11,892,975 | B1 * | 2/2024 | Rubin-Smith .......... | G06F 3/065 |
| 11,977,457 | B2 * | 5/2024 | Thomsen .............. | G06F 21/602 |
| 2022/0012134 | A1 * | 1/2022 | Chatterjee .......... | G06F 11/1464 |
| 2022/0050858 | A1 * | 2/2022 | Karr .................... | G06F 11/3466 |
| 2022/0100379 | A1 * | 3/2022 | O'Halloran ............. | G06F 3/065 |
| 2022/0114062 | A1 * | 4/2022 | Madan ................ | G06F 11/1469 |
| 2022/0253355 | A1 * | 8/2022 | Resch ................. | G06F 11/2097 |
| 2023/0125145 | A1 * | 4/2023 | Gunda .................... | G06F 3/065 |
| | | | | 711/162 |
| 2023/0185675 | A1 * | 6/2023 | Thomsen ............ | G06F 21/6227 |
| | | | | 707/640 |
| 2023/0393946 | A1 * | 12/2023 | Barui .................... | H04L 9/0894 |
| 2024/0143460 | A1 * | 5/2024 | Tan ...................... | G06F 11/2025 |
| 2024/0256391 | A1 * | 8/2024 | Shetty .................... | G06F 3/067 |

\* cited by examiner

*Primary Examiner* — Huawen A Peng
(74) *Attorney, Agent, or Firm* — Anderson Gorecki LLP

(57)     ABSTRACT

A cascaded Remote Data Forwarding (RDF) facility includes a first leg on which asynchronous RDF is used to mirror data of a set of storage volumes from a first data center to a second data center, and a second leg on which adaptive copy RDF is used to mirror data from the second data center to a cyber recovery vault. A number of invalid tracks of data owed by the second data center to the cyber recovery vault is monitored. When the number of invalid tracks on the second leg of the RDF facility drops below a threshold value, transmission of data on the first leg of the RDF facility is suspended, while continuing to transmit data on the second leg. Upon achieving a consistent state of data at the cyber recovery vault, a snapshot of each of the storage volumes is created in the cyber recovery vault.

20 Claims, 9 Drawing Sheets

FIG. 2

Cascaded RDF: RDF/A → ADCOPY-DISK

Figure 6:
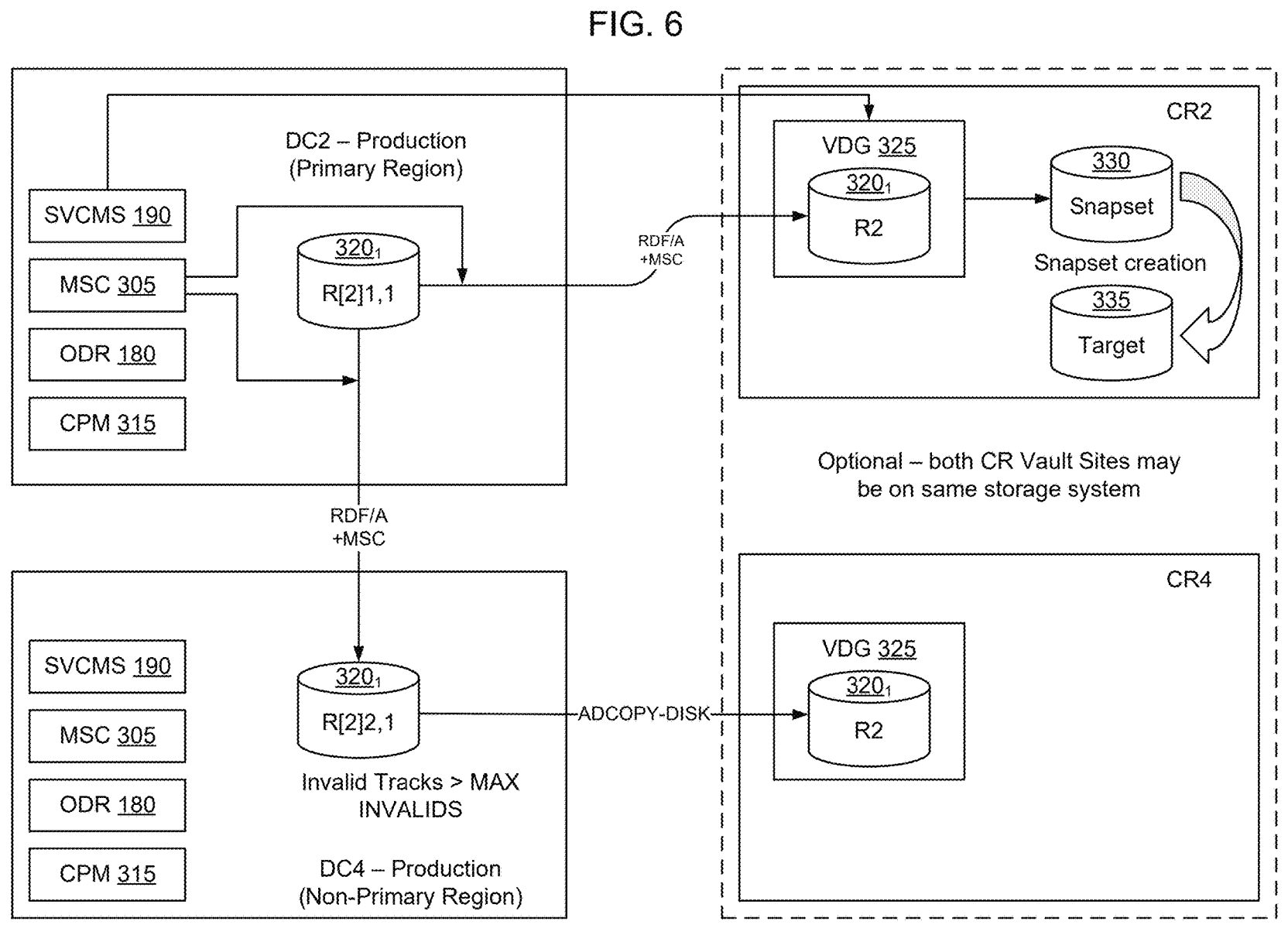

330 Snapset

Snapset creation

335 Target

VDG 325

320₁ R2

Optional – both CR Vault Sites may be on same storage system

CR4

VDG 325

320₁ R2

RDF/A +MSC

ADCOPY-DISK

DC2 – Production (Primary Region)

SVCMS 190

MSC 305

ODR 180

CPM 315

320₁ R[2]1,1

RDF/A +MSC

DC4 – Production (Non-Primary Region)

SVCMS 190

MSC 305

ODR 180

CPM 315

320₁ R[2]2,1

Invalid Tracks > MAX INVALIDS

CYBER PROTECTION AUTOMATION WITH INTERMITTENT CONSISTENCY

FIELD

This disclosure relates to computing systems and related devices and methods, and, more particularly, to cyber protection automation with intermittent consistency.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, orchestrated disaster recovery cyber protection automation with intermittent consistency operates to ensure creation of snapsets of storage volumes in a cyber recovery vault when the cyber recovery vault is connected in a cascaded data replication facility, and the initial data replication on the data replication facility is implemented using asynchronous data replication.

In some embodiments, a cascaded data replication facility is created, in which asynchronous data replication (Remote Data Forwarding—Asynchronous: RDF/A) with Mulit-Session Consistency (MSC) is used to transmit data on a first leg of the cascaded data replication facility from a first data center DC1 to a second data center DCx. The cascaded data replication facility also includes a second leg in which ADCOPY-DISK data replication mode is used to transmit data from the second data center DCx to a Cyber Recovery (CR) vault CRy. Consistency is intermittently achieved in the cyber recover vault CRy by determining that less than a maximum number of invalid tracks is owed by the second data center DCx to the cyber recovery vault CRy, and in response to this determination, temporarily suspending transmission of data on the first leg of the cascaded data replication facility while continuing to transmit data from the second data center DCx to the cyber recovery vault CRy. In response to a determination that the number of invalid tracks that is owed by the second data center DCx to the cyber recovery vault CRy has reached zero, an instance of intermittent consistency has been achieved at the cyber recovery vault CRy. Once the data of the storage volumes on the cyber recovery vault CRy in a consistent restartable state, a Storage Volume Creation and Management System (SVCMS) is used to create a snapshot of each storage volume contained in the cyber recovery vault CRy, and transmission of data on the first leg of the cascaded data replication facility is resumed. This process iterates to intermittently achieve consistency between the cyber recovery vault CRy and the second data center DCx, to create periodic snapsets of storage volumes in the cyber recovery vault CRy. Snapshots of the snapset may optionally be linked to a set of target devices at the cyber recovery vault CRy.

In some embodiments, a method of automated orchestration of cyber protection for a set of storage volumes using intermittent consistency, includes defining a cascaded remote data forwarding facility, the cascaded remote data forwarding facility including a first leg on which asynchronous remote data forwarding is used to mirror data of a set of storage volumes from a first data center to a second data center, the cascaded remote data forwarding facility also including a second leg on which adaptive copy data forwarding is used to mirror data of the set of storage volumes from the second data center to a cyber recovery vault, transmitting data on the first leg of the cascaded remote data forwarding facility from the first data center to the second data center, and transmitting the data on the second leg of the cascaded remote data forwarding facility from the second data center to the cyber recovery vault. The method also includes monitoring, on the second data center, a number of invalid tracks of the data owed by the second data center to the cyber recovery vault on the second leg of the remote data forwarding facility, and in response to a determination that the number of invalid tracks owed by the second data center to the cyber recovery vault on the second leg of the remote data forwarding facility is less than or equal to a maximum threshold value, suspending transmission of data on the first leg of the remote data forwarding facility while continuing to transmit data on the second leg of the remote data forwarding facility. The method further includes determining a consistent state of data on a set of storage volumes at the cyber recovery vault and, in response to the determined consistent state of the data, creating a snapset of the storage volumes in the cyber recovery vault. The method further includes, after creation of the snapset of the storage volumes in the cyber recovery vault, resuming transmission of data on the first leg of the cascaded remote data forwarding facility.

In some embodiments, determining the consistent state of data on the set of storage volumes at the cyber recovery vault includes monitoring, on the second data center, the number of invalid tracks of the data owed by the second data center to the cyber recovery vault on the second leg of the remote data forwarding facility after suspending transmission of data on the first leg of the remote data forwarding facility, and in response to a determination that the number of invalid tracks owed by the second data center to the cyber recovery vault on the second leg of the remote data forwarding facility has reached zero invalid tracks, determining that the consistent state of the data has been achieved at the cyber recovery vault.

In some embodiments, the maximum threshold value of the number of invalid tracks owed by the second data center to the cyber recovery vault on the second leg of the remote data forwarding facility is determined based on a timeout threshold of the first leg of the remote data forwarding facility. In some embodiments, the timeout threshold of the first leg of the remote data forwarding facility is an amount of time that the first leg of the remote data forwarding facility may remain in a suspended state before being dropped. In some embodiments, the maximum threshold value of the number of invalid tracks owed by the second data center to the cyber recovery vault on the second leg of the remote data forwarding facility is further determined based on an amount of time it takes to transmit each invalid track from the second data center to the cyber recovery vault.

In some embodiments, the method further includes linking the snapset of the storage volumes to a target set of devices in the cyber recovery vault.

In some embodiments, the method further includes iterating the steps of monitoring the number of invalid tracks, determining that the number of invalid tracks is less than or equal to the maximum threshold value, suspending transmission of data on the first leg, determining the consistent state, creating a snapset, and resuming transmission. In some embodiments, the step of iterating is initiated at a regular cadence. In some embodiments, the step of iterating is initiated upon closure of an airgap between the second data center and the cyber recovery vault.

In some embodiments, the method further includes creating a versioned data group of the storage volumes that are contained in the cyber recovery vault, and the step of creating the snapset includes creating a snapshot of each storage volume contained in the versioned data group.

In some embodiments, asynchronous remote data forwarding is a data mirroring mode in which each respective track of data is mirrored from the first data center to the second data center over the first leg of the cascaded remote data forwarding facility when the respective track is received at the first data center, and adaptive copy data forwarding is a data replication mode configured to enable bulk copy operations to be implemented between the second data center and the cyber recovery vault over the second leg of the cascaded remote data forwarding facility.

BRIEF DESCRIPTION OF THE DRAWINGS

FIG. 2 is a block diagram of a storage environment including four Data Centers (DC) arranged in a square data reproduction facility, and including one or more Cyber Recovery (CR) vault sites, according to some embodiments.

In FIG. 4, snapshot creation in the cyber recovery vault CRy is triggered by closure of an airgap between data center DCx and the cyber recovery vault CRy.

In FIG. 5, snapshot creation in the cyber recovery vault CRy occurs according to a particular cadence.

FIGS. 6-9 are block diagrams of a portion of the storage environment of FIG. 2, showing the state of a production device DC4 and cyber recovery vault CR4 at different points in time, to enable protection of a set of storage volumes in the cyber recovery vault CR4 upon achievement of intermittent consistency between the storage volumes on DC4 and the corresponding storage volumes in the cyber recovery vault CR4, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
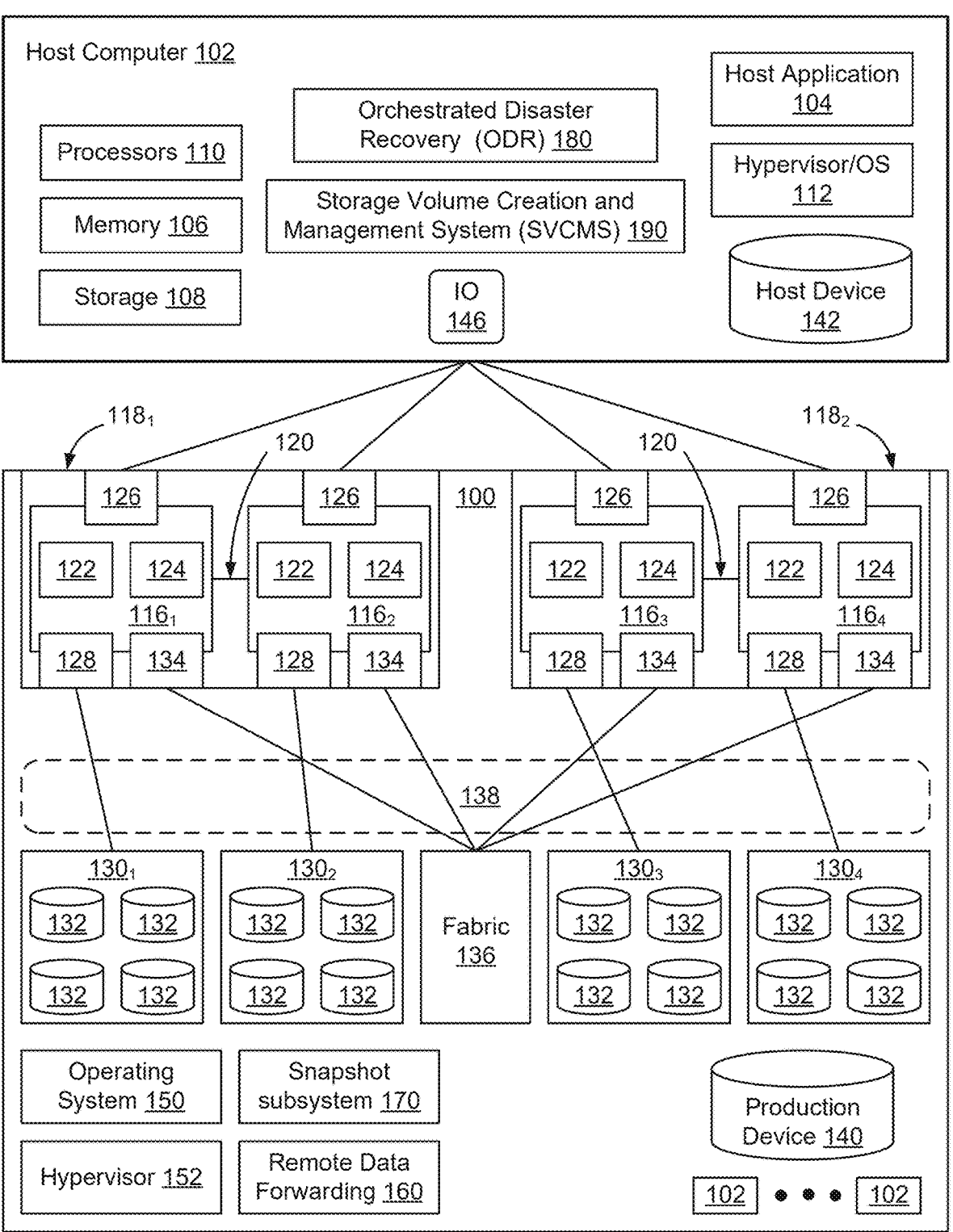
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$)

and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. In some implementations, from the perspective of the host application 104, the host device 142 is a single data storage device having a set of contiguous fixed-size LBAs (Logical Block Addresses) on which data used by the host application 104 resides and can be stored. The data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host local volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data at the production device 140 to a location to which the block is written on the managed drives 132.

Hosts 102, such as mainframe (zOS) computer systems, store data using storage resources of the storage systems 100. Software, such as an Orchestrated Disaster Recovery (ODR) application 180 is used to automate, react, and monitor large scale mainframe and mixed mainframe-open systems environments, to provide continuous operations or automated failover during planned or unplanned events. One example commercially available ODR application 180 is referred to as Geographically Dispersed Disaster Recovery (GDDR) which is available from Dell™, although the techniques described herein can be used in connection with other forms of ODR applications 180. Although some embodiments will be described using GDDR as an example implementation of an ODR application 180, it should be understood that the techniques described herein for automated orchestration of cyber protection can be used in other environments as well.

In some embodiments, ODR application 180 is a mainframe software product that automates business recovery procedures by reacting to events that its monitoring capability detects in a data center. Because the ODR application 180 is designed to provide system restart following disasters, ODR application 180 does not reside in the same systems that it is seeking to protect. Rather, ODR application 180 resides on separate logical partitions from those that run application workloads.

In some embodiments, ODR application 180 works in connection with remote data forwarding subsystem 160 of storage system 100 to create replication facilities between pairs of similarly configured storage systems 100. Replication of data on a replication facility will be referred to herein as remote data forwarding (RDF). As described in greater detail herein, in some embodiments one of the storage systems, that is configured to implement cyber protection as a cyber recovery vault, includes a snapshot subsystem configured to create point in time copies of storage volumes upon achievement of intermittent consistency with a respective data center. A snapshot of a storage volume, such as production device 140, is point-in-time copy of the storage volume at the storage volume existed at the time that the snapshot was created.

In some embodiments, host computer runs a mainframe software application configured to manage creation and management of storage volumes and to interact with the storage systems 100 that are providing storage resources to the host computer 102, to ensure that the storage systems 100 are correctly configured to provide continuous data protection for mainframe data assets. For example, as shown in FIG. 1, in some embodiments the host computer includes Storage Volume Creation and Management System (SVCMS) 190 that is configured to interact with storage system 100 to cause the snapshot subsystem 170 of storage system 100 to create snapshots of storage volumes that are used by host computer 102 and are stored in the cyber recovery vault on a regular cadence.

In some embodiments, SVCMS 190 interacts with the storage system 100 that is being used as the cyber recovery vault to create a versioned data group of the storage volumes that are contained in the cyber recovery vault that are to be backed up. SVCMS 190 also interacts with the snapshot subsystem 170 of the storage system 100 to cause the snapshot subsystem 170 to create snapsets (groups of snapshots) of the storage volumes of the versioned data group. In this way, the mainframe host 102 can control creation of snapsets of volumes of data by the snapshot subsystem 170 within the cyber recovery vault, to create point in time recovery points of the set of storage volumes stored in the cyber recovery vault.

In some embodiments, as shown in FIG. 1, one application that may be executing on storage system 100 is a Remote Data Forwarding (RDF) application process 160, which causes selected storage volumes to be mirrored by the storage system 100 to one or more similar backup storage systems 100.

It is possible for a primary storage system 100 (R1) to perform data replication to a backup storage system 100 (R2) where the storage systems 100 are compatible and properly configured. The RDF application 160, when executed on storage system 100, enables the storage system 100 to participate in storage system level data replication between sets of mirroring pairs of storage systems 100. A set of storage systems 100 that are configured for data to be mirrored from a primary storage system 100 (R1) to a backup storage system 100 (R2) will be referred to herein as a "Data Replication Facility". A given storage system, such as storage system 100, may operate as a primary storage system 100 R1 or backup storage system 100 R2 in many mirroring pairs, and hence multiple RDF applications 160 may simultaneously execute on storage system 100 to control participation of the storage system 100 in the mirroring operations. As used herein, the term "cascaded" data replication facility refers to a data replication facility in which data is replicated from a first data center DC1 to a second data center DC2 on a first leg of the data replication facility, and then is replicated from the second data center DC2 to a third data center DC3 on a second leg of the data replication facility. In some embodiments, as described in greater detail herein, a cascaded data replication facility is created in which the third data center DC3 is a cyber recovery vault CRy.

Data transfer among storage systems, including transfers between storage systems 100 for data replication (mirroring) functions, may take place in several ways depending on how the primary storage system R1 handles data written by the host 102 and how the backup storage system R2 acknowledges receipt of data on the data replication facility. Three example data mirroring modes will be referred to herein as synchronous data replication mode (RDF/S), asynchronous data replication mode (RDF/A), and Adaptive Copy Disk data replication mode (ADCOPY-DISK).

In synchronous data replication mode (RDF/S), data is transmitted from the primary storage system R1 to the backup storage system R2 as the data is received from the host 102, and an acknowledgement of a successful write is transmitted by the backup storage system R2 synchronously with the completion thereof. To maintain a synchronous relationship between the primary storage system R1 and the backup storage system R2, each IO from the host 102 is forwarded by the primary storage system R1 to the backup storage system R2 as it is received from host 102, and the primary storage system R1 will wait for an acknowledgment from the backup storage system R2 before issuing a subsequent IO from the host 102.

In asynchronous data replication mode (RDF/A), when data is received from the host 102, the data is written to the primary storage system R1 and a data transfer process is initiated to write the data to the backup storage system R2 on the data replication facility. The primary storage system R1 acknowledges the write operation to the host 102 before the primary storage system R1 has received an acknowledgement that the data has been received by the backup storage system R2. The use of asynchronous data replication RDF/A enables the data on the primary storage system R1 and backup storage system R2 to be one or more cycles out of synchronization, because the primary storage system R1 will continue to execute IOs prior to receipt of acknowledgments from the backup storage system R2. The use of asynchronous replication RDF/A may be beneficial in connection with sites located geographically distant from each other, for example where the distance between the primary storage system R1 and the backup storage system R2 is such that waiting for an acknowledgement from the backup storage system R2 would take considerable time and, hence, reduce responsiveness of the primary storage system R1 to the host 102.

Adaptive Copy Disk (ADCOPY-DISK) data replication mode, as that term is used herein, refers to an asynchronous type of data replication in which data is transmitted from the primary storage system R1 to the backup storage system R2 using a best-efforts type of data replication between the storage systems. In adaptive copy, the data on the backup storage system R2 may be more than one IO out of synchronization with the primary storage system R1 and, accordingly, data consistency at the backup storage system R2 is not guaranteed. Adaptive copy enables bulk copy operations to be implemented between the primary storage system R1 and the backup storage system R2, for example when there are many tracks to synchronize between the two storage systems.

In some embodiments, the storage systems are configured such that a cascaded data replication facility is able to include RDF/S data replication on the first leg and either RDF/A data replication or ADCOPY-DISK data replication on the second leg, or to use RDF/A data replication on the first leg and ADCOPY-DISK on the second leg. However, in some embodiments, the storage systems are configured to not allow creation of a cascaded data replication facility on which RDF/A data replication is used on both the first and second leg of the cascaded data replication facility.

Figure 2:
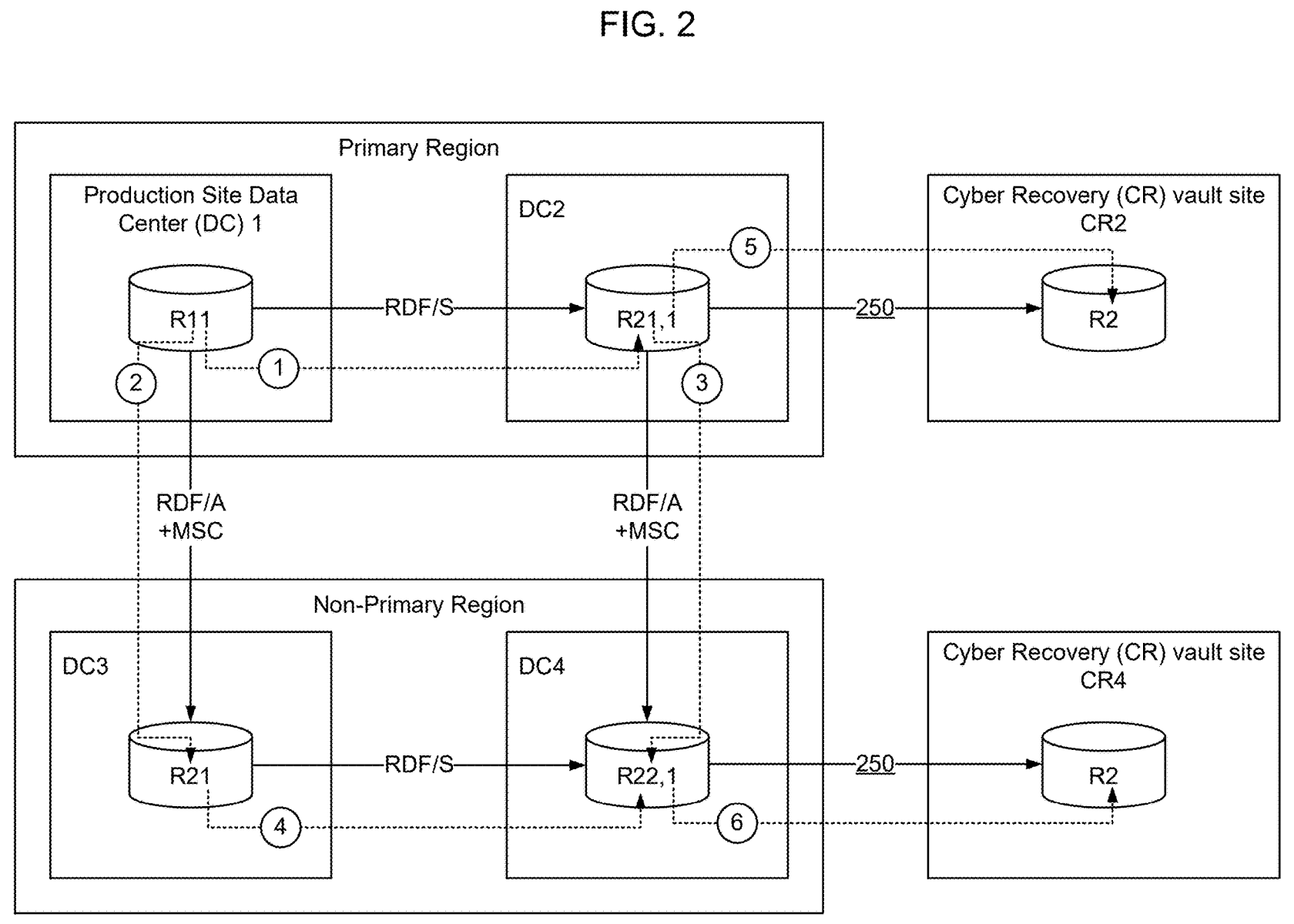

There are many types of data reproduction facilities that may be created, which may have different topographies depending on the number of data centers and the manner in which data is configured to be replicated between the data centers. For example, FIG. 2 is a block diagram of a storage environment including four Data Centers (DC) arranged in a square data reproduction facility that also includes one or more Cyber Recovery (CR) vault sites, according to some embodiments. Although some embodiments are described herein in which the data reproduction facility is implemented using a square topography, it should be understood that other topographies may be used as well depending on the particular implementation.

In the nomenclature adopted in the figures, the letter "R" is used to refer to one or more storage volumes that has been included in a replication facility, such that data that is written to one or more of the storage volumes will be replicated on the data replication facility (R). The numbers following the letter R indicate if the storage volume is a source (designated by a number 1) or a receiver (designated by the number 2). In FIG. 2, the square topography of the data replication facility includes a first pair of data centers, DC1 and DC2, in a primary region and a second pair of data centers, DC3 and DC4, in a non-primary region.

In the data replication facility shown in FIG. 2, production site data center DC1 is the source (R11) on both a first replication session to data center DC2 (Arrow 1) and on a second replication session to data center DC3 (Arrow 2). Synchronous data replication RDF/S is used to replicate data between the data centers in the primary region (on Arrow 1 from DC1 to DC2) and asynchronous data replication RDF/A is used to replicate data between the primary and non-primary regions (on Arrow 2 from DC1 to DC3). DC2 likewise replicates data received from DC1 in a cascaded manner to DC4 over an asynchronous data replication session (Arrow 3). Further, within the non-primary region, DC3 replicates data received from DC1 in a cascaded manner to DC4 (Arrow 4) using synchronous data replication. Hence, in FIG. 2, the square data replication facility includes four data replication sessions:

DC1→DC2 (Arrow 1: synchronous remote data forwarding RDF/S).

DC1→DC3 (Arrow 2: asynchronous remote data forwarding RDF/A)

DC2→DC4 (Arrow 3: asynchronous remote data forwarding RDF/A).

DC3→DC4 (Arrow 4: synchronous remote data forwarding RDF/S)

In some embodiments, orchestrated disaster recovery application 180 is used to configure the data replication facility to enable data to be mirrored between storage systems DC1, DC2, DC3, and DC4 so that, in the event of a failure of one of the storage systems, the data remains available on one or more of the other storage systems. It should be noted that the same set of storage volumes, that originate at DC1, are replicated on each of the replication sessions (Arrows 1, 2, 3, and 4). In the event of a failure, the orchestrated disaster recovery application 180 enables failover from one storage system to another of the storage systems of the data replication facility. Although FIG. 2 shows a square-shaped data replication facility, it should be understood that data replication facilities can have different numbers of storage systems and different topographies depending on the implementation.

In FIG. 2, a Cyber Recovery (CR) vault site is connected by a replication facility (Arrow 5) with one of the production sites DC2, which is the source of production data that is to be protected using the cyber recovery vault CR2. In FIG. 2, production site DC2 is connected by a replication data facility (Arrow 5) to a cyber recovery vault CR2, although cyber recovery vault CR2 may be connected to any production site DCx. In some embodiments, Cyber Protection Automation (CPA) is implemented using Orchestrated Disaster Recovery application 180, to create copies of data at a cyber recovery vault (CRV) site CR2 that can be used for cyber recovery, for example in instances where the data maintained by the storage systems implementing the data replication facility is corrupted in a malware attack. In some embodiments, the storage volume creation and management system (SVCMS) 190 is used to create regular snapsets at the cyber recovery vault CR2, which is a physically separate, possibly airgapped, cyber recovery vault CR2 using a Cyber Protection Automation (CPA) process. Likewise, in FIG. 2, production site DC4 is connected by a replication data facility (Arrow 6) to a second cyber recovery vault CR4, although the second cyber recovery vault CR4 may be connected to any production site DCx.

An airgap, as that term is used herein, refers to the relative isolation of the storage system implementing the cyber recovery vault CRy from the production site DCx. As shown in FIG. 2, in some embodiments the production site DCx and cyber recovery vault CRy 205 are connected by RDF links 250. In an airgapped solution, these RDF links 250 are normally offline, making data flow impossible. When an airgap connection is enabled, that means that data flow is possible and the RDF links 250 are online. When an airgap connection is disabled, that means data flow is not possible because the RDF links 250 are offline. By using an airgap, it is possible to physically isolate the cyber recovery vault CRy from the production sites DCx of the replication data facility. In some embodiments, the cyber recovery vault CRy controls the state of the airgap to selectively toggle the RDF links 250 between online and offline states.

U.S. Pat. No. 11,580,065, entitled Automated Orchestration of Cyber Protection of a Set of Storage Volumes, describes a process of protecting storage volumes by creation of snapsets of the storage volumes on the production site DCx, linking the snapsets to a set of target devices on the production site DCx, and then transmission of the data from the linked target devices to the cyber recovery vault CRy to enable the snapsets to be stored in the cyber recovery vault CRy. The content of U.S. Pat. No. 11,580,065 is hereby incorporated herein by reference in its entirety. This previous solution required additional space for creation of the snapsets on the production sites, and required additional processing associated with linking the snapsets to the target devices at the production sites and transmission of the data from the target devices to the cyber recovery vault CRy.

According to some embodiments, a new space-saving implementation is provided which removes the space requirements at the source site by adding support for the creation of consistent snapsets directly in the cyber recovery vault, without first creating corresponding snapsets in the production site. Specifically, as described in greater detail herein, a process is described by which snapsets are created from R2 devices in the cyber recovery vault CR4 when intermittent consistency is achieved between the R2 storage volumes in the cyber recovery vault CR4 and the R1 storage volumes in the corresponding data center DC4. The snapsets created in the cyber recovery vault CR4 may optionally be linked to a set of target devices on the cyber recovery vault CR4.

In some embodiments, as described herein, in a cascaded data replication facility, it is not possible to use RDF/A data replication with Multi-Session Consistency (MSC) on two consecutive legs of the cascaded data replication facility. Accordingly, in instances where a first leg of a cascaded data replication facility is implemented using RDF/A+MSC, it is not possible to use this same replication technology on the second leg of the cascaded data replication facility. In instances where the cyber recovery vault CRy is on the end of the second leg, it accordingly is not possible to use RDF/A+MSC to ensure consistency of the storage volumes within the cyber recover vault CRy.

According to some embodiments, orchestrated disaster recovery cyber protection automation with intermittent consistency operates to ensure creation of consistent snapsets of storage volumes in a cyber recovery vault CRy, when the cyber recovery vault CRy is connected to a data center and ADCOPY-DISK data replication is used to mirror data to the cyber recovery vault CRy on the data replication facility.

In some embodiments, a cascaded data replication facility is created, in which asynchronous data replication (Remote Data Forwarding—Asynchronous: RDF/A) with Mulit-Session Consistency (MSC) is used to transmit data on a first leg of the cascaded data replication facility from a first data center DC1 to a second data center DCx. The cascaded data replication facility also includes a second leg in which ADCOPY-DISK data replication mode is used to transmit data from the second data center DCx to a Cyber Recovery (CR) vault CRy.

Consistency is intermittently achieved in the cyber recover vault CRy by determining that less than a maximum number of invalid tracks is owed by the second data center DCx to the cyber recovery vault CRy, and in response to this determination, temporarily suspending transmission of data on the first leg of the cascaded data replication facility while continuing to transmit data from the second data center DCx to the cyber recovery vault CRy. In response to a determination that the number of invalid tracks that is owed by the second data center DCx to the cyber recovery vault CRy has reached zero, an instance of intermittent consistency has been achieved at the cyber recovery vault CRy. Once the data of the storage volumes on the cyber recovery vault CRy in a consistent restartable state, a Storage Volume Creation and Management System (SVCMS) is used to create a snapshot of each storage volume contained in the cyber recovery vault CRy, and transmission of data on the first leg of the cascaded data replication facility is resumed. This process iterates to intermittently achieve consistency between the cyber recovery vault CRy and the second data center DCx, to create periodic snapsets of storage volumes in the cyber recovery vault CRy. Snapshots of the snapset may optionally be linked to a set of target devices at the cyber recovery vault CRy.

Figure 3:
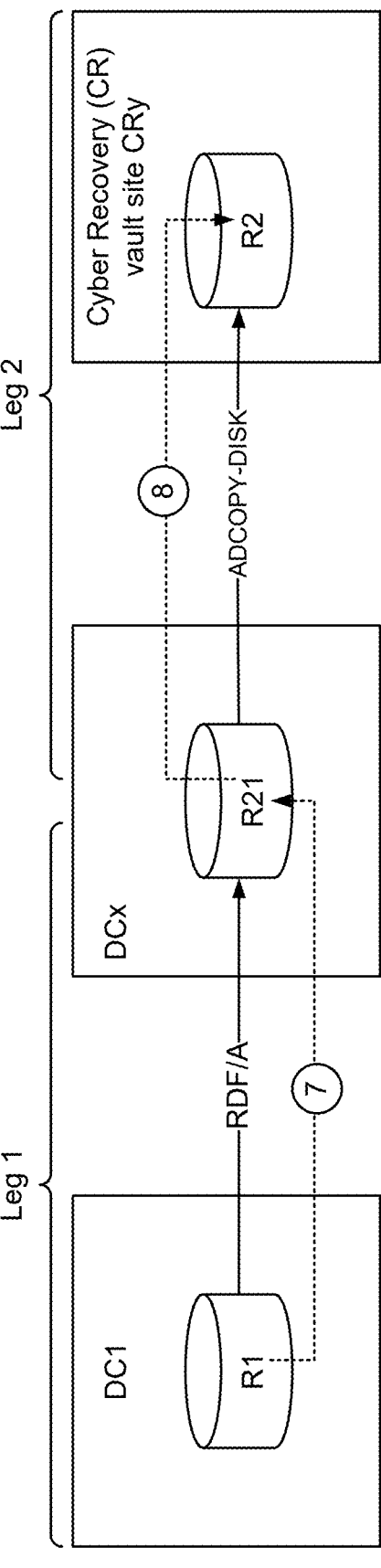
FIG. 3 is a block diagram of an example cascaded remote data replication facility, including a first leg on which asynchronous data replication RDF/A with Mulit-Session Consistency (MSC) is used to transmit data from a first data center DC1 to a second data center DCx, and including a second leg in which ADCOPY-DISK data replication mode is used to transmit data from the second data center DCx to a Cyber Recovery (CR) vault CRy.

FIG. 3 is a block diagram of an example cascaded remote data replication facility, including a first leg (Arrow 7) on which asynchronous data replication RDF/A with Multi- Session Consistency (MSC) is used to transmit data from a first data center DC1 to a second data center DCx, and including a second leg (Arrow 8) in which ADCOPY-DISK data replication mode is used to transmit data from the second data center DCx to a Cyber Recovery (CR) vault CRy. As described in greater detail herein, in some embodiments although the relationship between the source site (DCx) and the cyber recovery vault CRy is ADCOPY-DISK, consistent snapsets in the cyber recovery vault CRy are created from R2 devices which are the RDF targets of the source site production devices through the creation of intermittent consistency in the cyber recovery vault CRy. In some embodiments, creation of intermittent consistency is achieved by temporary suspension of asynchronous data replication RDF/A on the first leg, thus enabling the number of invalid tracks on the second leg to be reduced to zero. When the number of invalid tracks on the second leg reaches zero, the cyber recovery vault CRy has achieved consistency with the source site (DCx) and a snapset of the storage volumes of the versioned data group is able to be created on the cyber recovery vault CRy. After creation of the snapset, transmission of data on the first leg of the cascaded remote data replication facility resumes.

Figure 4:
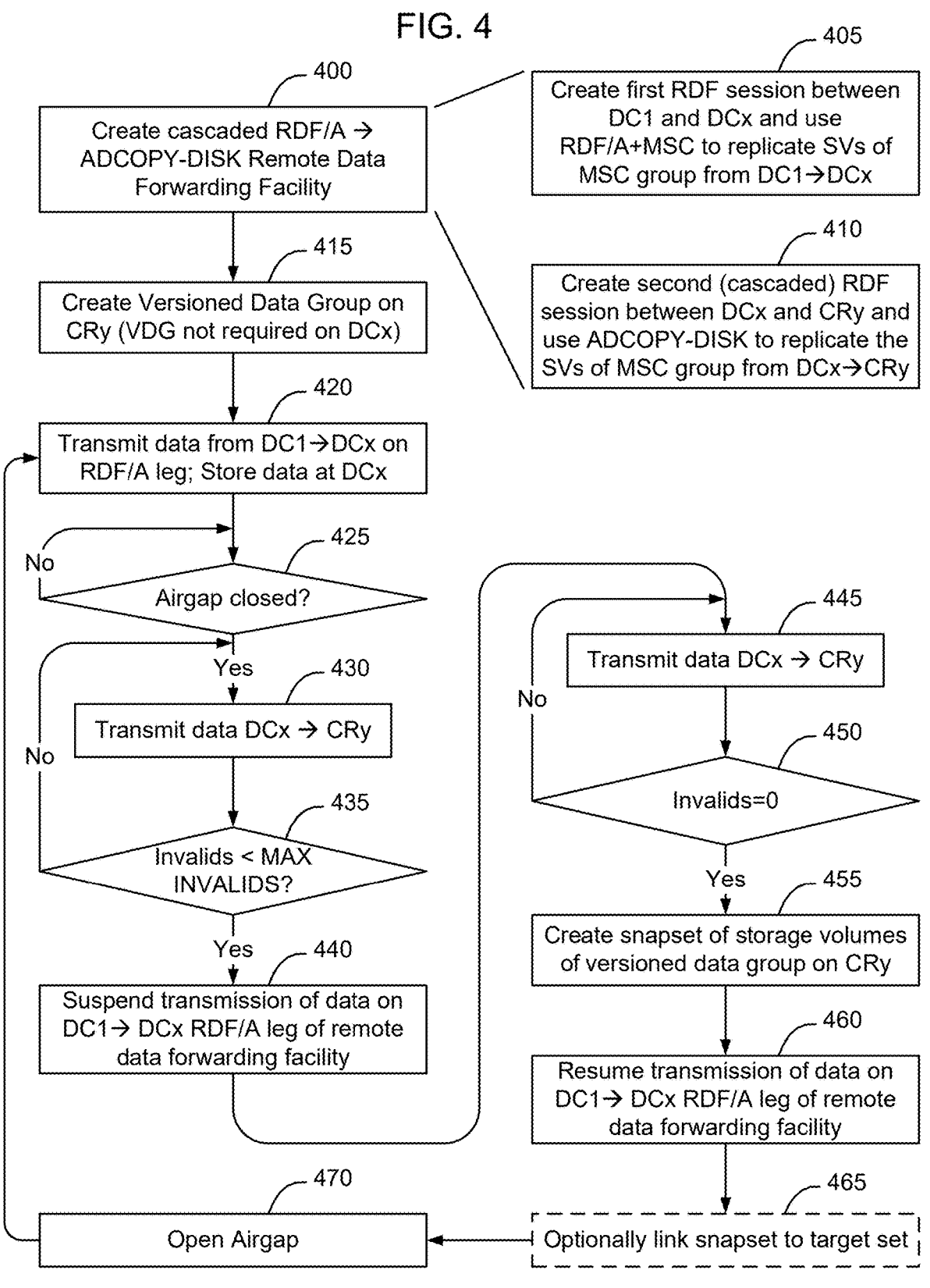
FIG. 4 is a flow chart of an example method of protecting a set of storage volumes of source data center DCx, by creation of snapshots of the storage volumes on cyber recovery vault CRy in the cascaded remote data replication facility of FIG. 3 upon achievement of intermittent consistency, according to some embodiments.

FIG. 4 is a flow chart of an example method of protecting a set of storage volumes of source data center DCx, by creation of snapshots of the storage volumes on cyber recovery vault CRy in the cascaded remote data replication facility of FIG. 3 upon achievement of intermittent consistency, according to some embodiments. In FIG. 4, snapshot creation in the cyber recovery vault CRy is triggered by closure of an airgap between data center DCx and the cyber recovery vault CRy to bring the RDF links 250 online.

As shown in FIG. 4, in some embodiments a cascaded RDF/A+MSC to ADCOPY-DISK data replication facility is created (block 400). For example, in some embodiments a first RDF session (leg 1) is created between data center DC1 and data center DCx, on which RDF/A+MSC is used to replicate a set of storage volumes of a MSC group from data center DC1 to data center DCx (block 405). A second RDF session (leg 2) is created between data center DCx and the cyber recovery vault CRy, on which ADCOPY-DISK is used to replicate a set of storage volumes of the MSC group from data center DCx to the cyber recovery vault CRy (block 410). Because snapshots will be created from the storage volumes in the cyber recovery vault CRy, a versioned data group (VDG) is created in the cyber recovery vault CRy (block 415).

Data is then transmitted from DC1 to DCx on the first leg of the remote data replication facility (block 420). For example, in embodiments where the MSC group includes a plurality of storage volumes, IO operations on the storage volumes at DC1 are mirrored to DCx on the first leg of the remote data replication facility using RDF/A, and MSC is used to ensure consistency between DC1 and DCx.

In some embodiments, as shown in FIG. 4, where an airgap is used to protect the cyber recovery vault CRy, transmission of data from DCx to the cyber recovery vault CRy on the second leg of the cascaded data replication facility is not possible while the airgap is open. Accordingly, in embodiments where an airgap is being used to isolate the cyber recovery vault CRy, the second data center DCx waits for the airgap to be closed, at which point the RDF links 250 are brought online and transmission of data on the RDF links 250 is possible (block 425).

In response to a determination that the airgap has closed (a determination of YES at block 425), the second data center DCx transmits data on the second leg of the data replication facility to the cyber recovery vault CRy (block 430). The second data center DCx monitors the number of invalid tracks owed to the cyber recovery vault CRy on the second leg of the data replication facility to determine when the number of invalid tracks (invalids) drops below a threshold value referred to herein as a maximum invalids value (MAX_INVALIDS). While the number of invalids is greater than the MAX_INVALIDS threshold value (a determination of NO at block 435), data continues to be transmitted on the second leg of the cascaded data replication facility to the cyber recovery vault CRy.

In response to a determination that the number of invalids is less than or equal to the MAX_INVALIDS threshold value (a determination of YES at block 435), transmission of data on the first leg of the cascaded data replication facility (from DC1 to DCx) is suspended (block 440). Data continues to be transmitted on the second leg of the data replication facility to the cyber recovery vault CRy (block 445). The second data center DCx monitors the number of invalid tracks owed to the cyber recovery vault CRy on the second leg of the data replication facility to determine when the number of invalid tracks (invalids) drops to zero (block 450).

In response to a determination that the number of invalid tracks owed to the cyber recovery vault CRy has decreased to zero (a determination of YES at block 450), intermittent consistency has been achieved at the cyber recovery vault CRy. Accordingly, a snapset of storage volumes of the versioned data group is created from the storage volumes in the cyber recovery vault CRy (block 455). After creation of the snapset (block 455), data transmission resumes on the first leg of the cascaded data replication facility (from DC1 to DCx) (block 460). Optionally, the snapshots may be linked to a target set of devices (block 465). In instances where an airgap is being used to protect the cyber recovery vault CRy, the airgap may also be opened to take the RDF links 250 offline (block 470).

In some embodiments, the MAX_INVALIDS threshold value is set based on a timeout time of the first leg of the data replication facility. In some embodiments, if transmission on the first leg of the data replication facility is suspended for too long, the first leg will time out thus causing the data replication facility to stop operation. In some embodiments the MAX_INVALIDS value is chosen based on the amount of time it takes to transmit invalids from the second data center DCx to the cyber recovery vault CRy on the second leg of the data replication facility, so that RDF/A on the first leg of the data replication facility does not drop when suspended for the time needed to completely synch that number (the MAX_INVALIDS number) of invalid tracks from the second data center DCx to the cyber recovery vault CRy. For example, if it takes 0.1 second to transfer each invalid from data center DCx to the cyber recovery vault CRy, and the RDF/A has a one second timeout period on the first leg, the MAX_INVALIDS value may be chosen to be a number of invalids fewer than 10, e.g., 5 invalids, to ensure that transmission of data on the second leg of the remote data forwarding facility to achieve consistency in the cyber recovery vault CRy takes less time than the timeout period on the RDF/A leg of the remote data replication facility.

Figure 5:
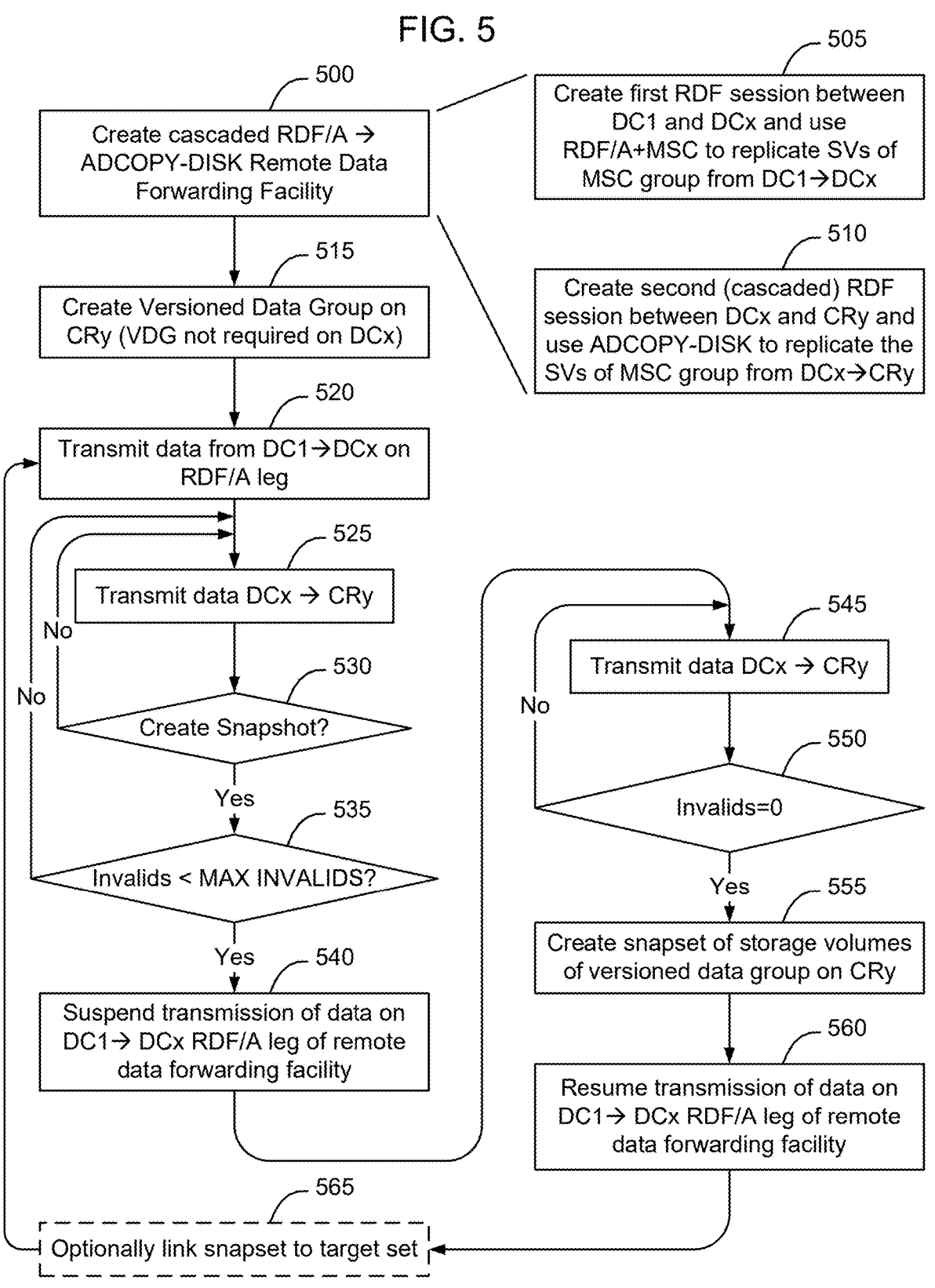
FIG. 5 is a flow chart of an example method of protecting a set of storage volumes of source data center DCx, by creation of snapshots of the storage volumes on Cyber Recovery Vault CRy in the cascaded remote data replication facility of FIG. 3 upon achievement of intermittent consistency, according to some embodiments.

FIG. 5 is a flow chart of an example method of protecting a set of storage volumes of source data center DCx, by creation of snapshots of the storage volumes on cyber recovery vault CRy in the cascaded remote data replication facility of FIG. 3 upon achievement of intermittent consistency, according to some embodiments. In FIG. 5, snapshot creation in the cyber recovery vault CRy occurs according to a particular cadence. FIG. 5 is thus similar to FIG. 4, with the exception of not including an airgap between data center DCx and cyber recovery vault CRy.

As shown in FIG. 5, in some embodiments a cascaded remote data replication facility is created (block 500) on which RDF/A is used to implement the first leg from DC1 to DCx (block 505), and ADCOPY-DISK is used to implement the second leg from DCx to CRy (block 510). A Versioned Data Group is created on the cyber recovery vault CRy (block 515). Data is transmitted from DC1 to DCx on the first leg (block 520) and transmitted from DCx to the cyber recovery vault CRy on the second leg (block 525). Because FIG. 5 assumes that the second leg of the remote data replication facility is not airgapped, unlike FIG. 4 data center DCx is able to directly transmit data to the cyber recovery vault CRy as it is received (block 525), and does not need to store data for transmission to the cyber recovery vault CRy until after closure of an airgap.

A determination is then made as to whether it is time to create snapshots of the storage volumes in the cyber recovery vault CRy. In some embodiments, snapshots may be created at a particular cadence or manually, depending on the implementation. In response to a determination that it is not time to create snapshots in the cyber recovery vault CRy (a determination of NO at block 530), the data center DCx continues transmitting data on the second leg of the data replication facility to try to keep the number of invalid tracks owed to the cyber recovery vault below a threshold value MAX_INVALIDS.

In response to a determination that it is time to create snapshots in the cyber recovery vault CRy (a determination of YES at block 530), a determination is made if the number of invalid tracks owed to the cyber recovery vault CRy exceeds the threshold value MAX_INVALIDS (block 535). In some embodiments, as noted above, the MAX_INVALIDS value is based on the amount of time it takes to transmit that number of invalids from data center DCx to the cyber recovery vault CRy, and the timeout period of the RDF/A processes executing to implement the first leg of the remote data replication facility. In response to a determination that the number of invalid tracks owed to the cyber recovery vault CRy exceeds the threshold value MAX_INVALIDS (a determination of No at block 535), data continues to be transmitted on both legs of the data replication facility.

In response to a determination that the number of invalid tracks owed to the cyber recovery vault CRy does not exceed the threshold value MAX_INVALIDS (a determination of YES at block 535), transmission of data on the first leg of the cascaded data replication facility (from DC1 to DCx) is suspended (block 540). Data continues to be transmitted on the second leg of the data replication facility from data center DCx to the cyber recovery vault CRy (block 545). The second data center DCx monitors the number of invalid tracks owed to the cyber recovery vault CRy on the second leg of the data replication facility to determine when the number of invalid tracks (invalids) drops to zero (block 550).

In response to a determination that the number of invalid tracks owed to the cyber recovery vault CRy has decreased to zero (a determination of YES at block 550), intermittent consistency has been achieved at the cyber recovery vault CRy. Accordingly, a snapset of storage volumes of the versioned data group is created from the storage volumes in the cyber recovery vault CRy (block 555). After creation of the snapshot (block 555), data transmission resumes on the first leg of the cascaded data replication facility (from DC1 to DCx) (block 560). Optionally, the snapshots that were created in the cyber recovery vault CRy may be linked to a target set of target devices in the cyber recovery vault CRy (block 565).

FIGS. 6-9 are block diagrams of a portion of the storage environment of FIG. 2, showing the state of a production device DC4 and cyber recovery vault CR4 at different points in time, to enable protection of a set of storage volumes in the cyber recovery vault CR4 upon achievement of intermittent consistency between the R1 storage volumes on DC4 and the corresponding R2 storage volumes in the cyber recovery vault CR4, according to some embodiments.

As shown in FIG. 6 at a first point in time, a production device DC2 in the primary region of a RDF facility transmits data of a set of storage volumes to a production device in a non-primary region of the RDF facility using asynchronous remote data forwarding replication RDF/A. Multi-site consistency (MSC) is used to achieve consistency between the storage volumes on data center DC2 and data center DC4. Data center DC4 has implemented a cascaded RDF facility such that data received by data center DC4 is transmitted to a cyber recovery vault CR4 using ADCOPY-DISK. In FIG. 6, the number of invalid tracks owed to the cyber recovery vault CR4 is greater than a maximum number of invalid tracks threshold value MAX_INVALIDS.

Figure 7:
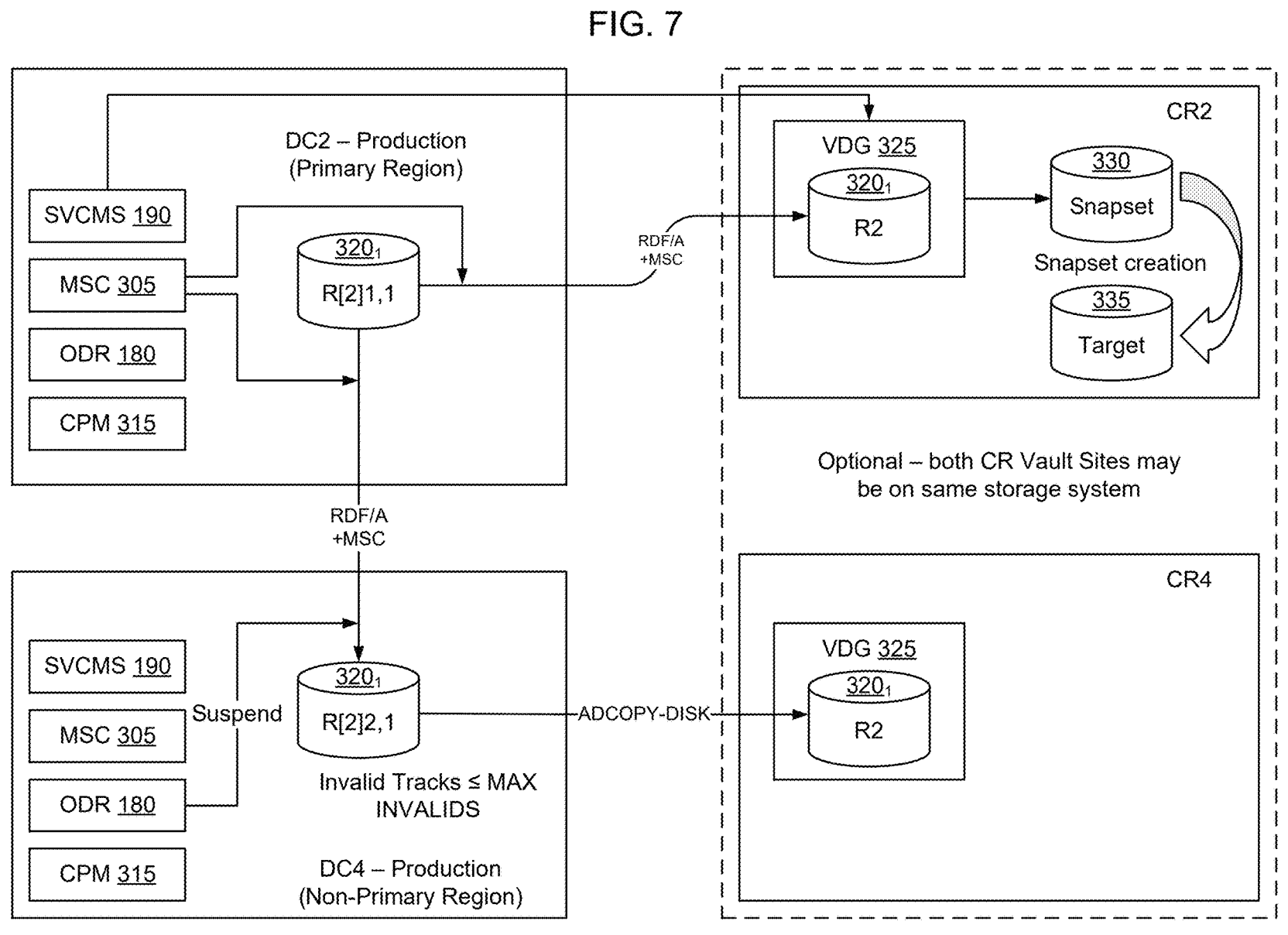

As shown in FIG. 7, at a subsequent point in time, the number of invalid tracks owed by data center DC4 to the cyber recovery vault CR4 has dropped to be less than or equal to the maximum number of invalid tracks threshold value MAX_INVALIDS. In response to a determination by the cyber protection manager 315 that the number of invalid tracks owed to the cyber recovery vault CR4 has dropped to be less than or equal to the MAX_INVALIDS value, ODR 180 has suspended transmission of data from data center DC2 to data center DC4 on the first leg of the cascaded remote data forwarding facility (data transmission on the RDF/A leg is suspended). Data center DC4 continues to transmit data on the second leg of the RDF facility (data transmission on the ADCOPY-DISK leg continues while data transmission on the first leg is suspended).

Figure 8:
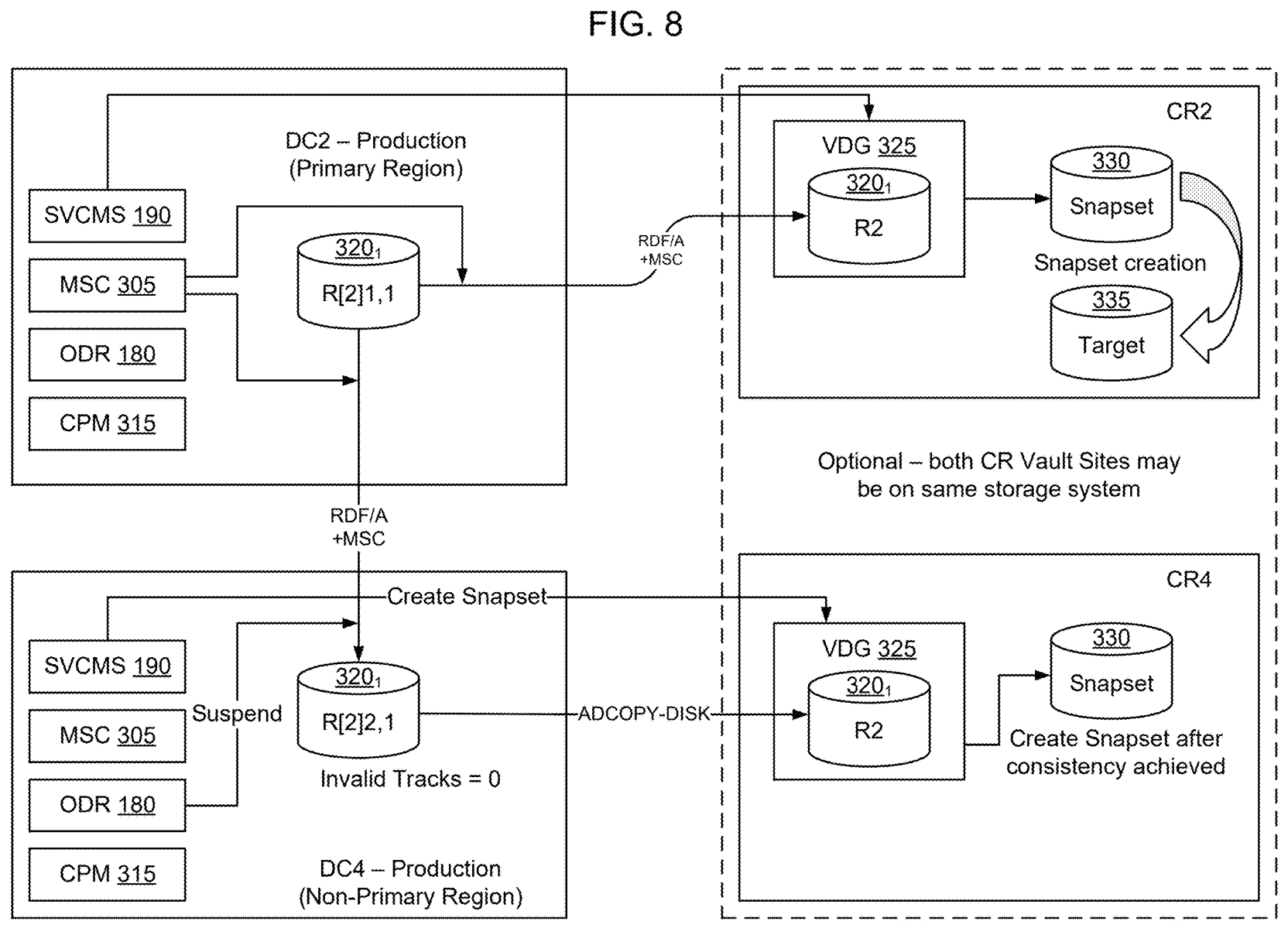

As shown in FIG. 8, at a subsequent period of time the number of invalid tracks owed by data center DC4 to the cyber recovery vault CR4 has dropped to zero. In response to a determination by the cyber protection manager 315 that the number of invalid tracks owed to the cyber recovery vault CR4 has dropped to zero, the cyber protection manager 315 instructs Storage Volume Creation and Management System (SVCMS) 190 to create a snapshot of each storage volume of the versioned data group 325 that has been created in the cyber recovery vault CR4.

Figure 9:
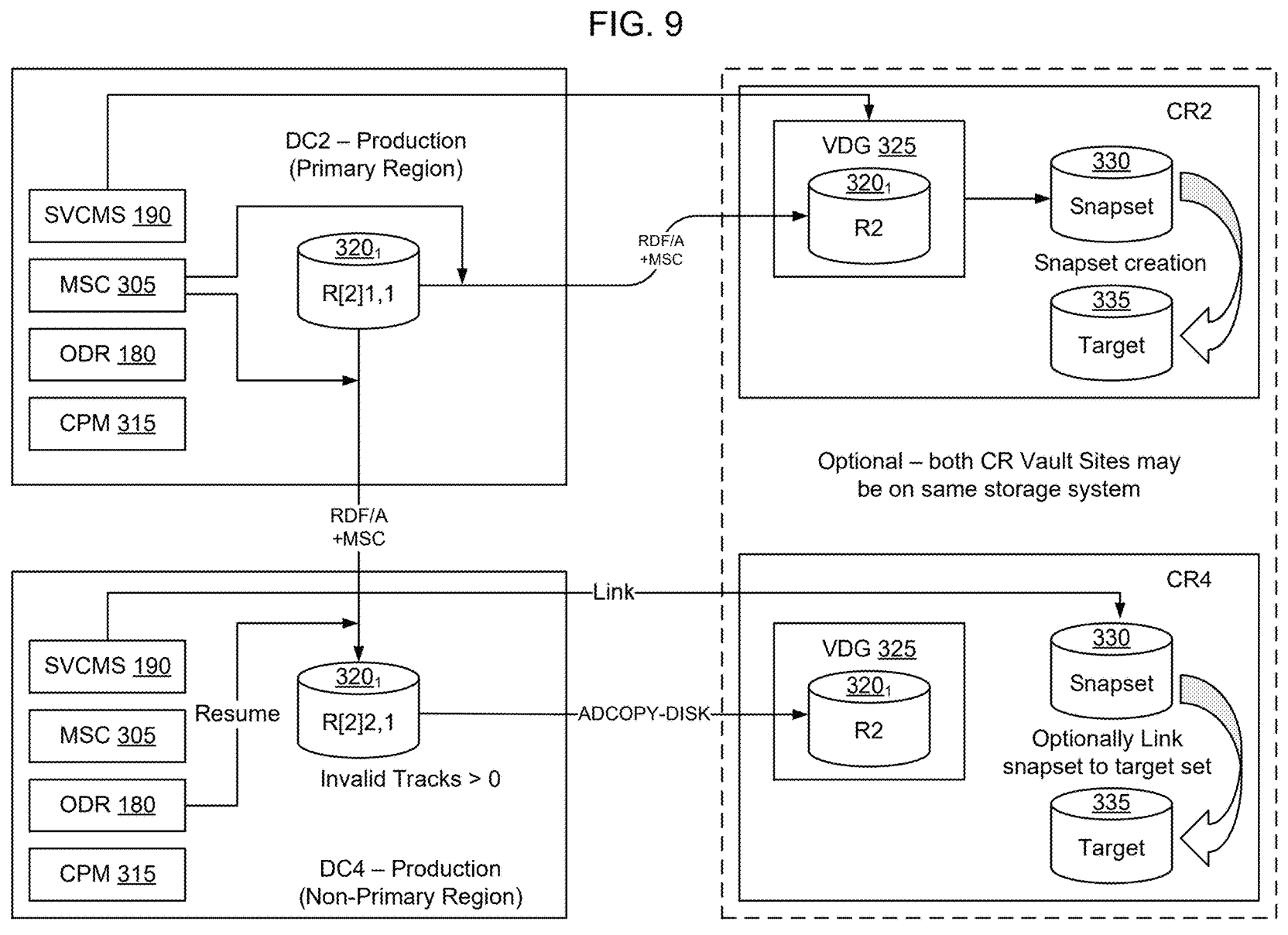

As shown in FIG. 9, after creation of the set of snapshots, transmission of data on the first leg of the cascaded data replication facility is resumed. Optionally, the SVCMS 190 may cause the set of snapshots to be linked to a target set of devices in the cyber recovery vault CR4. The process shown in FIGS. 6-9 then iterates, at a regular cadence or, in an airgapped solution, based on the state of the airgap between the cyber recovery vault CR4 and the data center DC4. Specifically, after resuming transmission on the RDF/A leg of the cascaded RDF facility, the storage systems return to the state shown in FIG. 6. In this manner, by achieving intermittent consistency between the data center DC4 and cyber recovery vault CR4, it is possible to create snapshots in a cyber recovery vault in instances where the cyber recovery vault CR4 is connected to RDF/A target devices.

In the example shown in FIGS. 6-9, data center DC2 is also shown as being connected to cyber recovery vault CR2. RDF/A with MSC is used to achieve consistency between data center DC2 and cyber recovery vault CR2, thus enabling snapsets to be created at a regular cadence in the cyber recovery vault CR2.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of automated orchestration of cyber protection for a set of storage volumes using intermittent consistency, comprising:

defining a cascaded remote data forwarding facility, the cascaded remote data forwarding facility including a first leg on which asynchronous remote data forwarding is used to mirror data of a set of storage volumes from a first data center to a second data center, the cascaded remote data forwarding facility also including a second leg on which adaptive copy data forwarding is used by the second data center to mirror the data of the set of storage volumes that is received by the second data center on the first leg of the cascaded remote data forwarding facility from the second data center to a cyber recovery vault;

transmitting data on the first leg of the cascaded remote data forwarding facility from the first data center to the second data center;

transmitting the data on the second leg of the cascaded remote data forwarding facility from the second data center to the cyber recovery vault;

monitoring, on the second data center, a number of invalid tracks of the data owed by the second data center to the cyber recovery vault on the second leg of the remote data forwarding facility, the number of invalid tracks identifying tracks of data that have been received by the second data center on the first leg of the cascaded remote data forwarding facility and not mirrored by the second data center to the cyber recovery vault on the second leg of the cascaded remote data forwarding facility;

in response to a determination that the number of invalid tracks owed by the second data center to the cyber recovery vault on the second leg of the remote data forwarding facility is less than or equal to a maximum threshold value, suspending transmission of data on the first leg of the remote data forwarding facility while continuing to transmit data on the second leg of the remote data forwarding facility;

determining a consistent state of data on a set of storage volumes at the cyber recovery vault;

in response to the determined consistent state of the data, creating, by the cyber recovery vault, a snapset of the storage volumes in the cyber recovery vault from the data that has been mirrored by the second data center to the cyber recovery vault on the second leg of the cascaded remote data forwarding facility; and after creation of the snapset of the storage volumes by the cyber recovery vault, resuming transmission of data on the first leg of the cascaded remote data forwarding facility.

2. The method of claim 1, wherein determining the consistent state of data on the set of storage volumes at the cyber recovery vault comprises:

monitoring, on the second data center, the number of invalid tracks of the data owed by the second data center to the cyber recovery vault on the second leg of the remote data forwarding facility after suspending transmission of data on the first leg of the remote data forwarding facility; and in response to a determination that the number of invalid tracks owed by the second data center to the cyber recovery vault on the second leg of the remote data forwarding facility has reached zero invalid tracks, determining that the consistent state of the data has been achieved at the cyber recovery vault.

3. The method of claim 1, wherein the maximum threshold value of the number of invalid tracks owed by the second data center to the cyber recovery vault on the second leg of the remote data forwarding facility is determined based on a timeout threshold of the first leg of the remote data forwarding facility.

4. The method of claim 3, wherein the timeout threshold of the first leg of the remote data forwarding facility is an amount of time that the first leg of the remote data forwarding facility may remain in a suspended state before being dropped.

5. The method of claim 3, wherein the maximum threshold value of the number of invalid tracks owed by the second data center to the cyber recovery vault on the second leg of the remote data forwarding facility is further determined based on an amount of time it takes to transmit each invalid track from the second data center to the cyber recovery vault.

6. The method of claim 1, further comprising linking the snapset of the storage volumes to a target set of devices in the cyber recovery vault.

7. The method of claim 1, further comprising iterating the steps of monitoring the number of invalid tracks, determining that the number of invalid tracks is less than or equal to the maximum threshold value, suspending transmission of data on the first leg, determining the consistent state, creating a snapset, and resuming transmission.

8. The method of claim 7, wherein the step of iterating is initiated at a regular cadence.

9. The method of claim 7, wherein the step of iterating is initiated upon closure of an airgap between the second data center and the cyber recovery vault.

10. The method of claim 1, wherein asynchronous remote data forwarding is a first data mirroring mode in which each respective track of data is mirrored from the first data center to the second data center over the first leg of the cascaded remote data forwarding facility when the respective track is received at the first data center; and wherein adaptive copy data forwarding is a second data replication mode configured to enable bulk copy operations to be implemented between the second data center and the cyber recovery vault over the second leg of the cascaded remote data forwarding facility.

11. A system for automated orchestration of cyber protection for a set of storage volumes using intermittent consistency, comprising:

one or more processors and one or more storage devices storing instructions that are operable, when executed by the one or more processors, to cause the one or more processors to perform operations comprising:

defining a cascaded remote data forwarding facility, the cascaded remote data forwarding facility including a first leg on which asynchronous remote data forwarding is used to mirror data of a set of storage volumes from a first data center to a second data center, the cascaded remote data forwarding facility also including a second leg on which adaptive copy data forwarding is used by the second data center to mirror the data of the set of storage volumes that is received by the second data center on the first leg of the cascaded remote data forwarding facility from the second data center to a cyber recovery vault;

transmitting data on the first leg of the cascaded remote data forwarding facility from the first data center to the second data center;

transmitting the data on the second leg of the cascaded remote data forwarding facility from the second data center to the cyber recovery vault;

monitoring, on the second data center, a number of invalid tracks of the data owed by the second data center to the cyber recovery vault on the second leg of the remote data forwarding facility, the number of invalid tracks identifying tracks of data that have been received by the second data center on the first leg of the cascaded remote data forwarding facility and not mirrored by the second data center to the cyber recovery vault on the second leg of the cascaded remote data forwarding facility;

in response to a determination that the number of invalid tracks owed by the second data center to the cyber recovery vault on the second leg of the remote data forwarding facility is less than or equal to a maximum threshold value, suspending transmission of data on the first leg of the remote data forwarding facility while continuing to transmit data on the second leg of the remote data forwarding facility;

determining a consistent state of data on a set of storage volumes at the cyber recovery vault;

in response to the determined consistent state of the data, creating, by the cyber recovery vault, a snapset of the storage volumes in the cyber recovery vault from the data that has been mirrored by the second data center to the cyber recovery vault on the second leg of the cascaded remote data forwarding facility; and after creation of the snapset of the storage volumes by the cyber recovery vault, resuming transmission of data on the first leg of the cascaded remote data forwarding facility.

12. The system of claim 11, wherein determining the consistent state of data on the set of storage volumes at the cyber recovery vault comprises:

monitoring, on the second data center, the number of invalid tracks of the data owed by the second data center to the cyber recovery vault on the second leg of the remote data forwarding facility after suspending transmission of data on the first leg of the remote data forwarding facility; and in response to a determination that the number of invalid tracks owed by the second data center to the cyber recovery vault on the second leg of the remote data forwarding facility has reached zero invalid tracks, determining that the consistent state of the data has been achieved at the cyber recovery vault.

13. The system of claim 11, wherein the maximum threshold value of the number of invalid tracks owed by the second data center to the cyber recovery vault on the second leg of the remote data forwarding facility is determined based on a timeout threshold of the first leg of the remote data forwarding facility.

14. The system of claim 13, wherein the timeout threshold of the first leg of the remote data forwarding facility is an amount of time that the first leg of the remote data forwarding facility may remain in a suspended state before being dropped.

15. The system of claim 13, wherein the maximum threshold value of the number of invalid tracks owed by the second data center to the cyber recovery vault on the second leg of the remote data forwarding facility is further determined based on an amount of time it takes to transmit each invalid track from the second data center to the cyber recovery vault.

16. The system of claim 11, further comprising linking the snapset of the storage volumes to a target set of devices in the cyber recovery vault.

17. The system of claim 11, further comprising iterating the steps of monitoring the number of invalid tracks, determining that the number of invalid tracks is less than or equal to the maximum threshold value, suspending transmission of data on the first leg, determining the consistent state, creating a snapset, and resuming transmission.

18. The system of claim 17, wherein the step of iterating is initiated at a regular cadence.

19. The system of claim 17, wherein the step of iterating is initiated upon closure of an airgap between the second data center and the cyber recovery vault.

20. The system of claim 11, wherein asynchronous remote data forwarding is a first data mirroring mode in which each respective track of data is mirrored from the first data center to the second data center over the first leg of the cascaded remote data forwarding facility when the respective track is received at the first data center; and wherein adaptive copy data forwarding is a second data replication mode configured to enable bulk copy operations to be implemented between the second data center and the cyber recovery vault over the second leg of the cascaded remote data forwarding facility.

* * * * *